US008131821B2

(12) United States Patent  
Dayon

(10) Patent No.: US 8,131,821 B2  
(45) Date of Patent: *Mar. 6, 2012

(54) SYSTEM FOR PUBLISHING, ORGANIZING, ACCESSING AND DISTRIBUTING INFORMATION IN A COMPUTER NETWORK

(75) Inventor: Alexandre Dayon, Paris (FR)

(73) Assignee: salesforce.com, inc., San Francisco, CA (US)

( * ) Notice: Subject to any disclaimer, the term of this patent is extended or adjusted under 35 U.S.C. 154(b) by 682 days.

This patent is subject to a terminal disclaimer.

(21) Appl. No.: 11/516,167

(22) Filed: Sep. 5, 2006

(65) Prior Publication Data

US 2007/0067414 A1    Mar. 22, 2007

Related U.S. Application Data

(63) Continuation of application No. 09/576,946, filed on May 22, 2000, now Pat. No. 7,130,879.

(60) Provisional application No. 60/148,029, filed on Aug. 10, 1999.

(51) Int. Cl.  
*G06F 15/16* (2006.01)

(52) U.S. Cl. ........ 709/218; 709/217; 715/234; 707/802; 707/736

(58) Field of Classification Search ............... 709/218, 709/217; 707/1, 2, 3, 4, 5, 6, 7, 8, 9, 10, 707/236, 802; 715/234  
See application file for complete search history.

(56) References Cited

U.S. PATENT DOCUMENTS

| 5,204,812 | A  | * | 4/1993  | Kasiraj et al. ............ 1/1 |
| 5,948,061 | A  |   | 9/1999  | Merriman et al. |
| 5,960,383 | A  | * | 9/1999  | Fleischer ............ 704/9 |
| 6,301,583 | B1 | * | 10/2001 | Zellweger ............ 707/103 R |
| 6,321,226 | B1 |   | 11/2001 | Garber et al. |
| 6,356,899 | B1 |   | 3/2002  | Chakrabarti et al. |
| 6,397,222 | B1 | * | 5/2002  | Zellweger ............ 707/102 |
| 6,460,034 | B1 | * | 10/2002 | Wical ............ 707/5 |
| 6,466,940 | B1 |   | 10/2002 | Mills |
| 6,701,350 | B1 |   | 3/2004  | Mitchell |
| 2001/0013001 | A1 | | 8/2001 | Brown et al. |

* cited by examiner

*Primary Examiner* — Carl Colin  
*Assistant Examiner* — Harunur Rashid  
(74) *Attorney, Agent, or Firm* — Novak Druce + Quigg LLP

(57) ABSTRACT

A method for searching documents including defining a plurality of dimensions with each having dimension values that define users, maintaining documents with each having sections, and determining a user coordinate having a specific set of dimension values. The method further includes assigning dimension values and an associated user coordinate to each section of each document, storing the sections of the documents in a retrievable form, and identifying dimension values associated with the user coordinate in accordance with a filtering methodology. The method further includes displaying the dimension values as menu items in which a user is permitted to access the menu items for the dimension values associated with the user coordinate, and identifying sections of documents that meet the respective dimension values associated with the user coordinate in accordance with the filtering methodology, so that a user is permitted to access sections of the documents that meet the dimension values.

15 Claims, 10 Drawing Sheets

US/Engineering

| Document with multiple sections |
|---|
| Section |
| Section Content     Section for US / Engineering / All employees<br><br>This section contains content for US / Engineering / All employees<br><br>    and    <br>US                      Engineering |

European/Engineering

| Document with multiple sections |
|---|
| |
| Section |
| Section Content     Section for French / Engineering / All employees<br><br>This section contains content for French / Engineering / All employees<br><br>    and    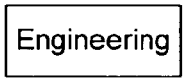<br>French                  Engineering |

European/Marketing

| Document with multiple sections |
|---|
| |
| Section |
| Section Content     Section for French / Marketing / All employees<br><br>This section contains content for French / Marketing / All employees<br><br>    and    <br>French                  Marketing |

Fig.5

SYSTEM FOR PUBLISHING, ORGANIZING, ACCESSING AND DISTRIBUTING INFORMATION IN A COMPUTER NETWORK

CLAIM OF PRIORITY

This application is a continuation of U.S. application Ser. No. 09/576,946 filed May 22, 2000 which was issued U.S. Pat. No. 7,130,879 on Oct. 31, 2006, which claims priority from Provisional Patent Application Ser. No. 60/148,029 filed on Aug. 10, 1999, entitled "System for Publishing, Organizing, Accessing and Distributing Information in a Computer Network," which is hereby incorporated by reference as if set forth in full in this document.

COPYRIGHT NOTICE

A portion of the disclosure recited in the specification contains material which is subject to copyright protection. Specifically, a Microfiche Appendix in accordance with 37 CFR Section 1.96 is included that lists source code instructions for a process by which the present invention is practiced in a computer system. The Microfiche Appendix comprises 16 sheets of microfiche containing 1458 pages of source code. The copyright owner has no objection to the facsimile reproduction of the specification as filed in the Patent and Trademark Office. Otherwise all copyright rights are reserved.

BACKGROUND

One or more implementations relate in general to the transfer of data in computer networks and more specifically to a system for publishing, organizing, accessing and distributing information in a computer network.

Accessing information, and publishing information for others to access or obtain, are features of computer networks. However, although the trend is to make information access and publishing easy for users of computers and computer networks, many of the mechanisms available are not easy for an average user to master. For example, publishing a web document not only requires a user to have some knowledge about where to publish, and to what audience to publish, but the user may have to publish the document to several "sites" or locations to make the document readily available to a desired number of users. This is the case, for example, when a company uses the company's network, or intranet, that has different web sites associated with different departments, regions, etc.

The lack of structure or organization of web pages, and documents, on networks can be both good and bad. Lack of structure can allow easy publishing of documents without placing a burden on the publisher to comply with a predefined organization. This also lets each web site developer, online business, database, etc., to create a customized organization that is best suited to the specific type of information. However, lack of structure and organization also creates difficulties for a user of the network to efficiently search for documents. Often a user has to perform many searches and access different websites and utilities to look for the document. This involves much typing and mouse (or other user input device) manipulation, is time-consuming and can be frustrating and counter-productive.

BRIEF SUMMARY

Embodiments allow a user to filter and view documents provided over a network. In one embodiment, a method includes defining a plurality of dimensions, each dimension having one or more dimension values that define one or more users; maintaining a plurality of documents, each document having a plurality of sections; and determining a user coordinate, wherein the user coordinate is a specific set of dimension values. The method further includes assigning one or more dimension values and an associated user coordinate to each section of each document; storing the plurality of sections of the plurality of documents in a retrievable form; and identifying one or more dimension values associated with the user coordinate in accordance with a filtering methodology. The method further includes displaying the one or more dimension values as menu items, wherein a user is permitted to access the menu items for the one or more dimension values associated with the user coordinate; and identifying sections of one or more documents that meet the respective dimension values associated with the user coordinate in accordance with the filtering methodology, so that a user is permitted to access sections of the one or more documents that meet the dimension values in accordance with the filtering methodology.

BRIEF DESCRIPTION OF THE DRAWINGS

FIG. 5 illustrates a document with multiple sections having different dimension values.

DETAILED DESCRIPTION

Various embodiments are discussed below, followed by a description of hardware suitable for use with the embodiments described herein.

Obtaining Documents

Figure 1:
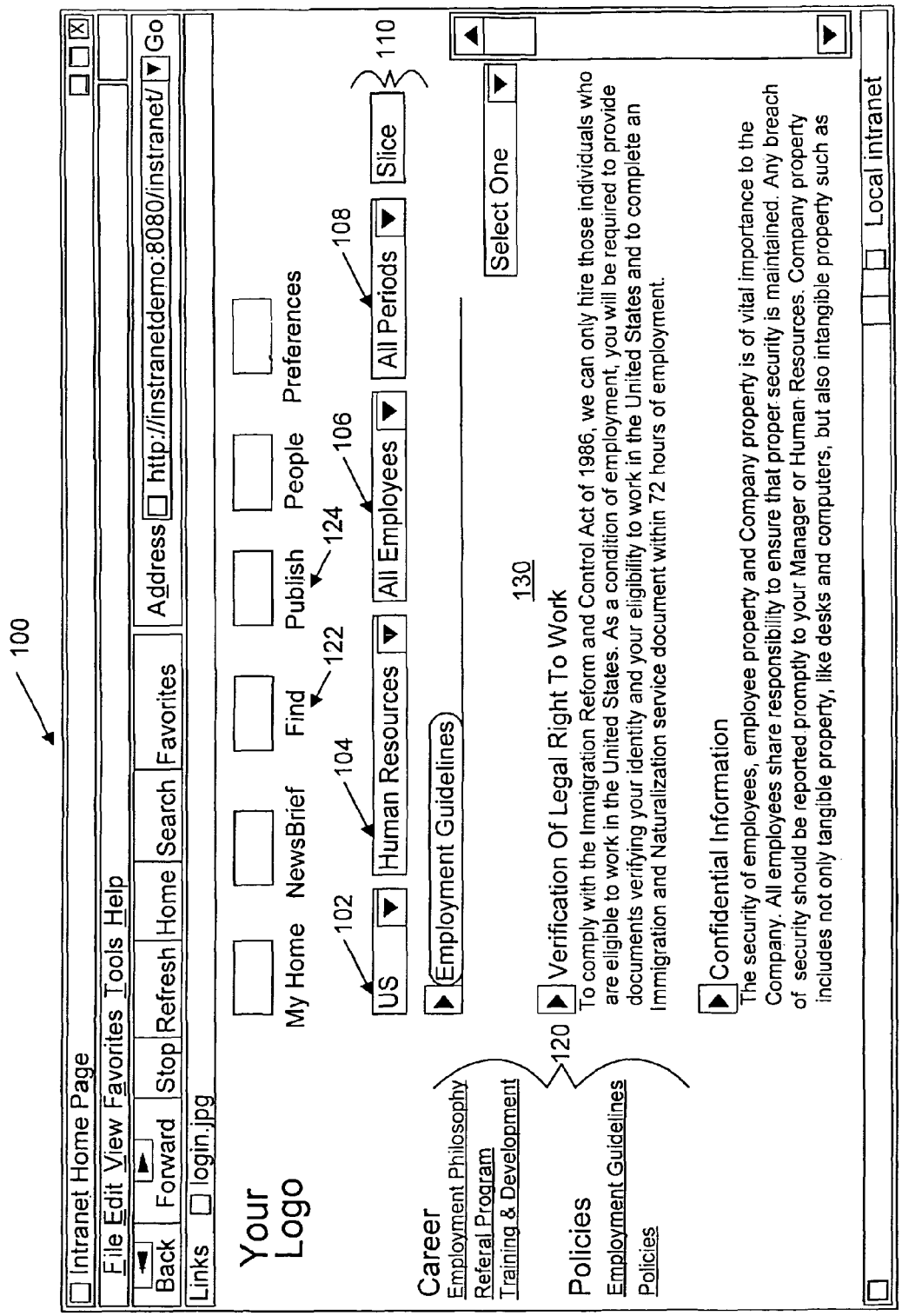
FIG. 1 illustrates a selector tool.

FIG. 1 shows screen display 100 of the user interface.

In FIG. 1, selector 110 is a set of four pull-down menus or lists. Each of pull-down menu corresponds to one "dimension" used to define the "slice," or "community." Each of pull-down menus 102, 104, 106 and 108 correspond, respectively, to the following dimensions: geographic location, corporate department, employee classification, time period.

Screen 100 shows the display after the user has set values for each of the dimensions as: "U.S."; Human Resources; All Employees; "All Periods." Thus, the slice, or community defined in selector 110 of screen display 100 is for documents associated with any employees, published at any time, in the companies U.S. offices relating to the company's Human Resources Department.

A list of the results of specifying the slice shown in FIG. 1 is to the left of the web-page at 120 of FIG. 1. This list shows two document type headings as "Career and Policies." Within the career heading, are three documents identified as "Employment Philosophy," "Referral Program," and "Training & Development." Under the "Policies" heading, are "Employment Guidelines" and "Policies." The list of documents at 120 is retrieved after the server automatically executes database search instructions according to the defined slice. The server begins executing the database search based on the defined slice when the user clicks on the "Find" icon at 122.

The user can view a selected document by clicking on the document name in the list at 120. The document is shown in the document viewing area at 130 of FIG. 1, below selector 110 and to the right of list 120.

In addition to document titles, uniform resource locators (URLs) can be shown in the list. By clicking on a URL, the user is taken to the corresponding web site, web page or other resource associated with the clicked URL.

Table I shows examples of possible values for dimensions.

In Table I, values for each of the dimensions used in selector 110 of FIG. 1 are as follows: the dimension "Geographic Location" can have values such as "Worldwide," "Asia," "Europe," "France," "U.K.," "America," and "U.S." Naturally, any number of geographic locations can be specified and placed into the list. The embodiments described herein allow values for dimensions to be organized in a hierarchy. As shown in Table I, the value "Worldwide" includes values encompassed by it. These "child" values (to which the value "Worldwide" is the parent) are indicated by progressively indenting to the right. Thus, "Asia," "Europe," and "America" are each given one level of indenting to the right. Under the "Europe" value are associated child values of "France" and "U.K." Under the value of "America" is the value "U.S."

TABLE I

| Geographic Location | Corporate Department | Employee Classification | Time Period |
|---|---|---|---|
| World- wide | All Departments | All employees | All Periods |
| Asia | Human Resources | Staff | Today |
| Europe | Corporate | Engineers | This Week |
| France | Marketing | Mid Level Managers | Last Week |
| U.K. | Engineering | Senior Managers | This Month |
| America | Accounting | Executives | |
| U.S. | | Board of Directors | |

Values for the other dimensions are shown in Table I. Note that other selections and arrangements of dimensions, and dimension values, are possible. In one embodiment, a system administrator is the one that sets up the dimensions, and dimension values, that can be used by users to define communities or slices. Thus, the system administrator is given control over the highest level of organization of documents in the network. Users use the dimensions, and dimension values to form slices to filter information and to obtain lists of documents.

Other arrangements for implementing selector 110 of FIG. 1 are possible. That is, each dimension need not be a pull-down list of items. For example, in one embodiment, the complete lists of all values for dimensions can be constantly displayed. The use of pull-down menus however, makes selector 110 more compact. Thus, leaving more room for, e.g., displaying the text of document, or for other purposes. For example, an arbitrary text entry can be allowed so that a list is not even provided. This may be useful, especially for the "Time Period" dimension so as to allow a user to type in dates and times. The time period can also be set graphically with sliders, clocks and calendars, etc.

Another example of a slice using the dimensions and dimension value shown in Table 1 is the following: the slice "Europe"; "Marketing"; "Staff"; "This Week"; results in a listing of all documents generated in the company's offices in Europe concerning the staff in the Marketing Department for the present week that the document request based on the slice is being made.

In one embodiment, once a slide is set, all of the user's subsequent browsing takes place within that slice. In other words, the user will not be shown, in the list at 120 of FIG. 1, documents or document headings, not associated with the selected slide. Themes which define which document headings, and documents, are shown in association with the slice are discussed in more detail below.

Thus, the user is able to "filter" documents in a way that makes sense within a corporate structure. In one embodiment, filtering can be at different levels. The possible levels are "Strict" and "Descending". Other embodiments can include "ascending" filtering which is also discussed below.

Figure 2A:
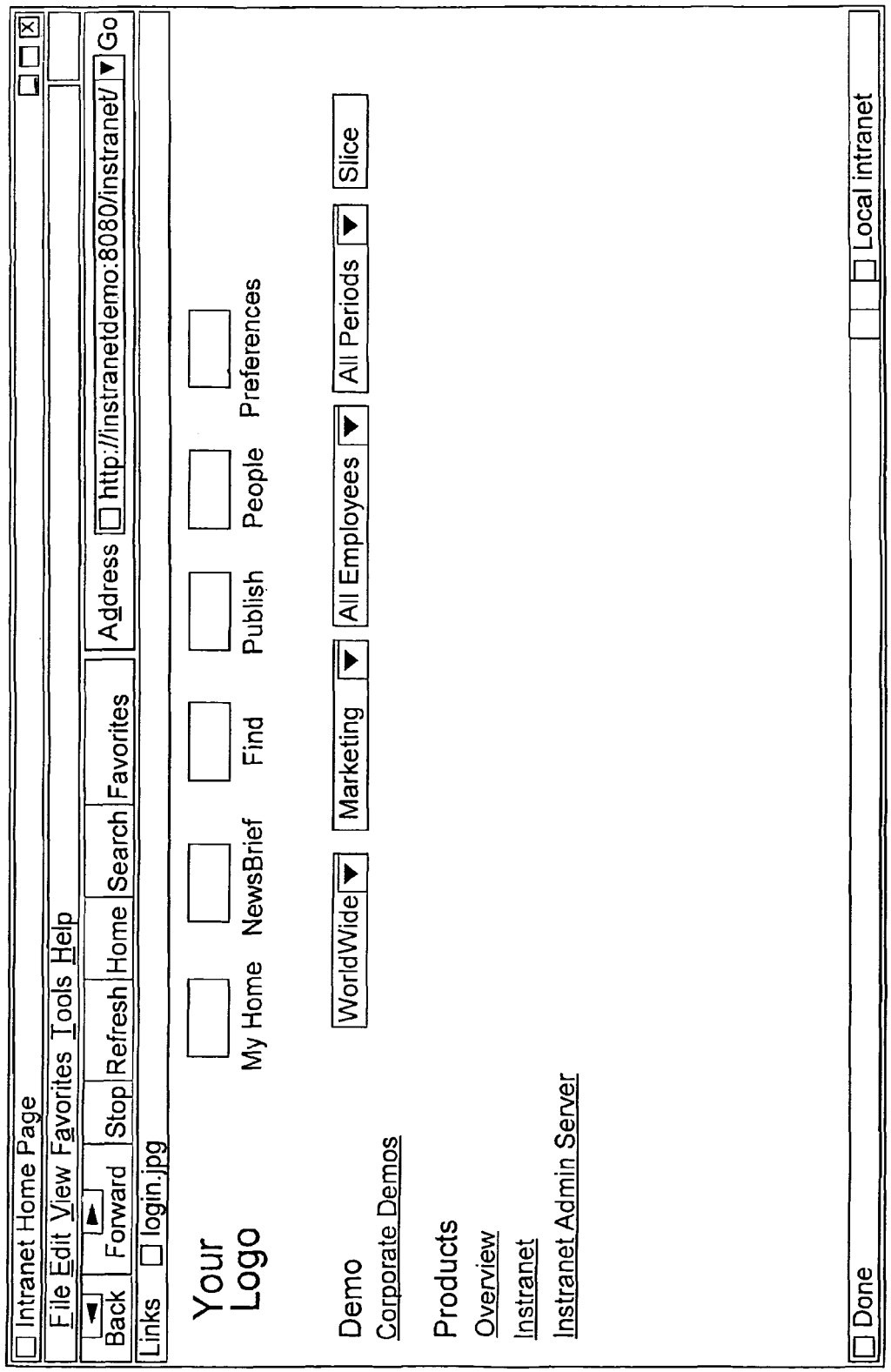
FIG. 2A illustrates strict filtering.

Strict filtering means that only the documents that are associated with the given slice are identified to the user. FIG. 2A illustrates the results of a search using strict filtering with the dimensions and possible dimension values shown in Table I. In FIG. 2A, only 4 documents in 2 categories meet the community "WorldWide; Marketing; All Employees; All Periods" with strict filtering.

In ascending filtering, in one embodiment, all documents are listed that are associated with the selected slice, or which are associated with other slices that match the selected slice but that have one or more dimension values that are a parent-value of the selected slice's dimension values. For example, using the geographic location dimension, the value "World-Wide" is a parent-value of the value "Europe". Similarly, the value "Europe" is a parent-value of the value "France". Thus, if the user is filtering the slice shown in FIG. 1 of "U.S.; Human Resources; All Employees; All Periods" all documents associated with the following slices will also be returned: "America; Human Resources; All Employees; All Periods", and "World-wide; Human Resources; All Employees; All Periods".

One embodiment uses only strict and descending filtering. Other embodiments can allow the user to select the type of filtering from among one or more of the three types. Other types of filtering are possible.

Figure 2B:
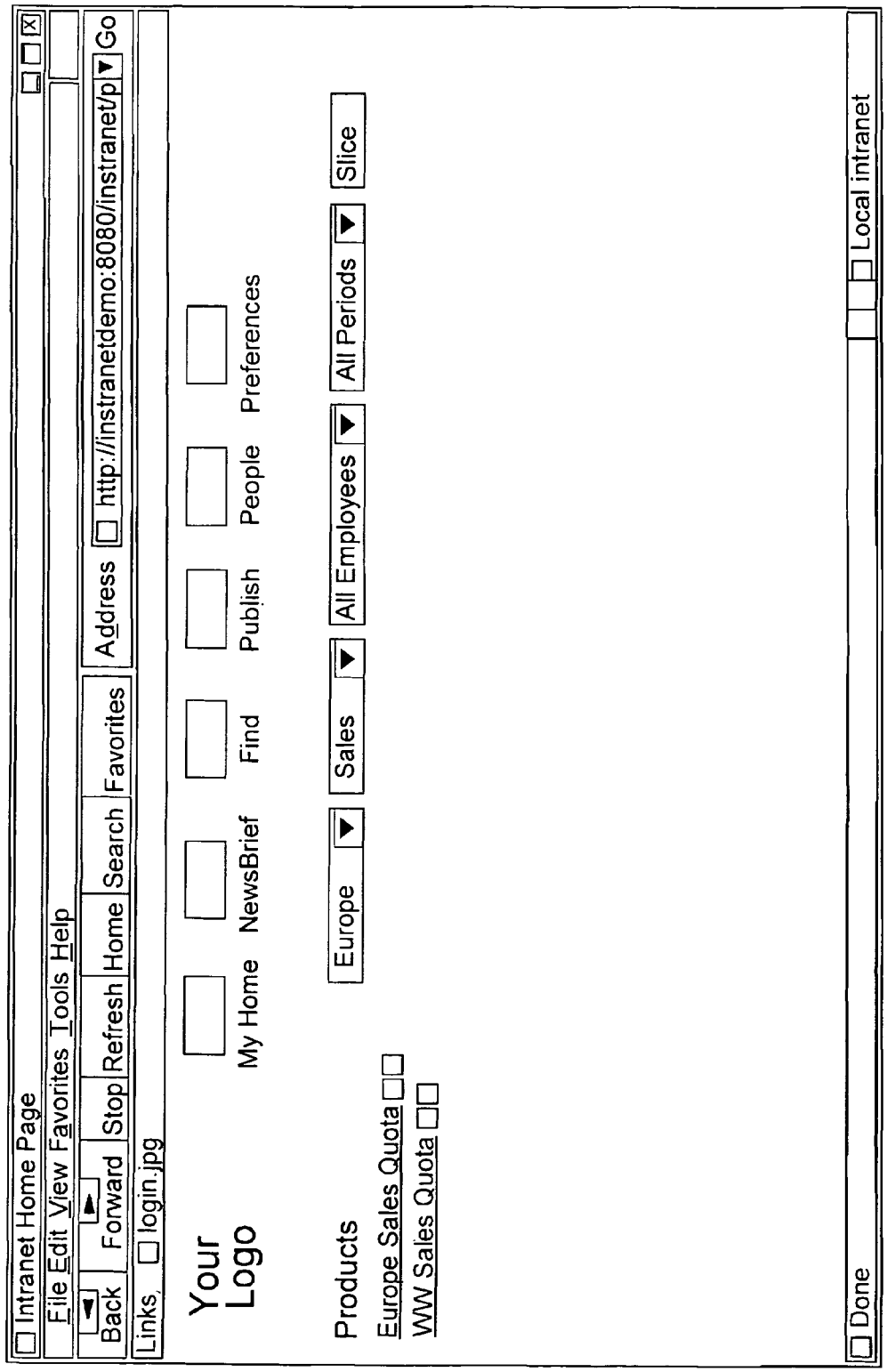
FIG. 2B illustrates ascending filtering.

FIG. 2B shows an example of the list of documents returned with ascending filtering used on the community "Europe; Sales; All Employees; All Periods". Documents are returned that are associated with both the European and worldwide sales reports.

"Descending" filtering is similar to "Ascending" filtering, but proceeds in the opposite direction with respect to dimension values. In "Descending" filtering, in one embodiment, all documents associated with the selected slice, and slices having the same dimension values as the selected slice and including slices having a dimension value that is the child-value of one or more of the selected slices dimension values, are provided to the user. For example, in the case where the slice specified is the "America; Human Resources; All Employees; All Periods" then documents associated with that slice and also the slice "U.S.; Human Resources; All Employees; All Periods" are also returned to the user.

Figure 2C:
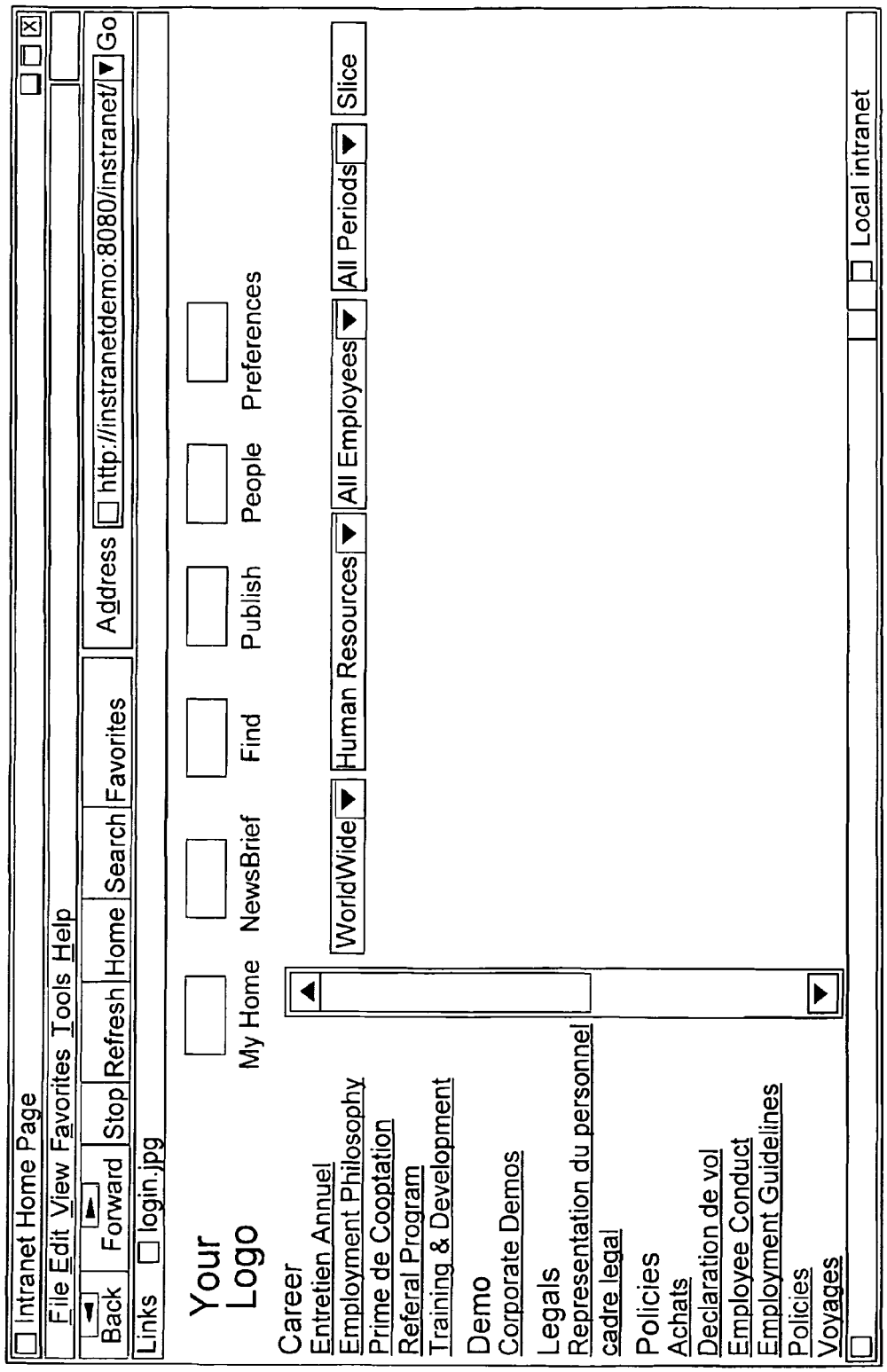
FIG. 2C illustrates descending filtering.

FIG. 2C illustrates descending filtering. FIG. 2C shows the results returned with the community "WorldWide; Human Resources; All Employees; All Periods". Note that many documents are identified which correspond to all geographic regions for Human Resources departments.

Figure 2D:
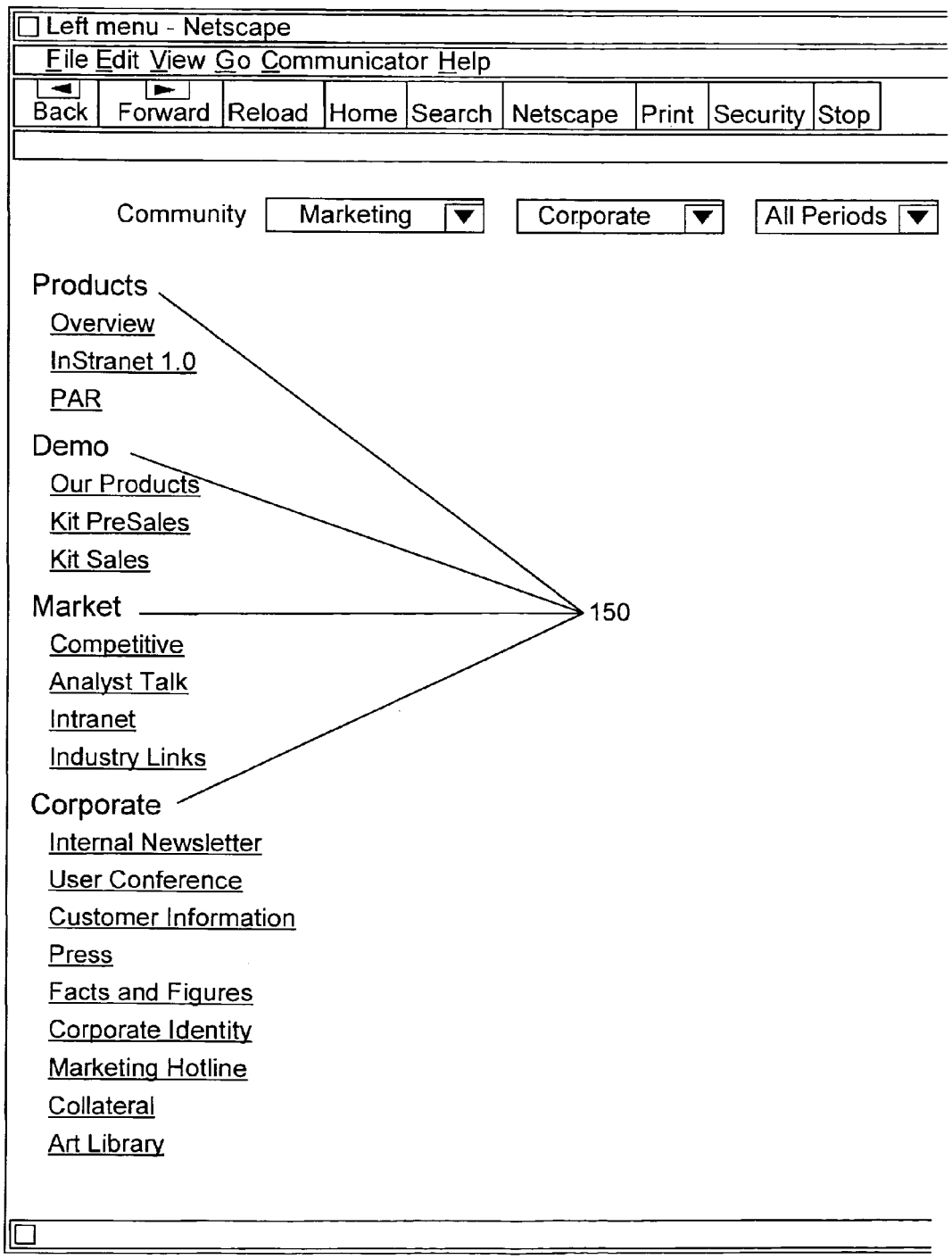
FIG. 2D illustrates the use of theme headings.
Figure 2E:
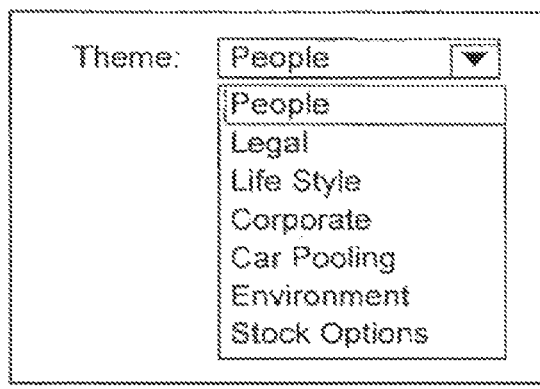
FIG. 2E illustrates a user interface mechanism for defining themes.
Figure 2F:
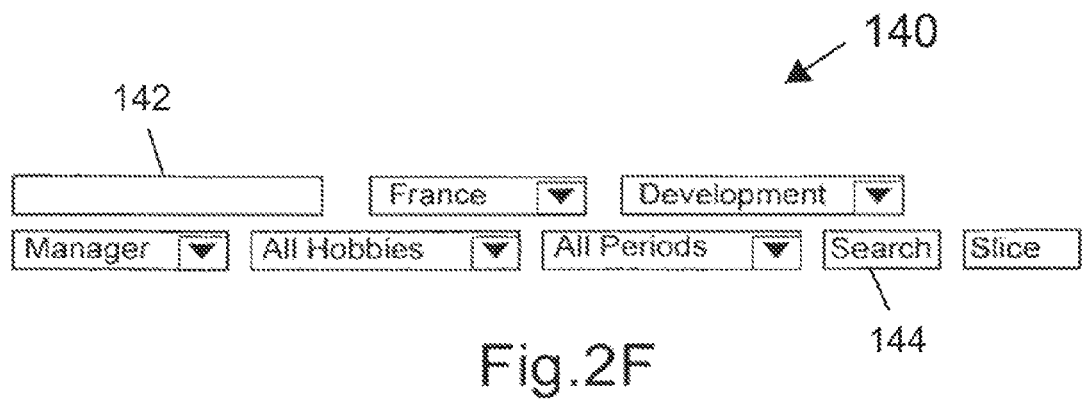
FIG. 2F shows a text search box used in conjunction with a slice selector tool.

A refinement to the selector tool is shown in FIG. 2F.

In FIG. 2F, selector 140 includes dimensions similar to selector 110 of FIG. 1, but also includes the added dimension of "Hobbies." Further, text entry window 142 is provided, along with search button 144. The use of the text entry window and search button allows a user to perform a keyword search within the defined slice. In one embodiment, documents within the slice filtering which also include the text phase or keyword specified in the text entry window will then be displayed to the user. Note that refinements are possible, such as allowing relational expressions within the text entry window.

Thus, slices are used to provide a filtering function across many documents in one or more web sites, servers, databases, etc. The slice is easily chosen by the user with the selector tool described above. Different filtering modes can be employed.

One embodiment enables users to predefine slices that can be recalled later. Such pre-defined slices are referred to as "channels." Thus, a user can select a slice such as "U.S.; Human Resources; All Employees; All Periods" and select a label to associate with the slice, such as "All US HR." Once designated as a channel, a hyperlink named "All US HR" appears on the user's display. This can be on a web page or part of a persistent toolbar, sidebar, etc. A user can then conveniently invoke the slice by merely clicking on the channel. The user can define multiple channels in this manner.

Predefined channels, or lists of channels, can be prepared and sent to other users. For example, where the channels are listed on web page, the web page can be emailed to one or more other users. By opening the emailed web page and clicking on the desired channel, the slice associated with that channel becomes the user's selected slice.

Publishing

Users can publish documents to the system. The publishing, and accessing, of documents is best understood using the two concepts of "coordinate" location and "scope" of visibility.

A coordinate is the specific set of dimension values associated with a user or document (or document section). Another way to think of a coordinate is as the community to which a user or document is associated. For example, a user can belong to the "France"; "Human Resources" community. Typically, a document published by a user is given the same coordinate, or community, as the publishing user. A user with a coordinate of "France"; "Human Resources" would publish to that coordinate. However, the system can be set up by the system administrator so that other coordinates are used as the default coordinates for publishing for any given user, department, geographic region, community, etc.

Figure 4:
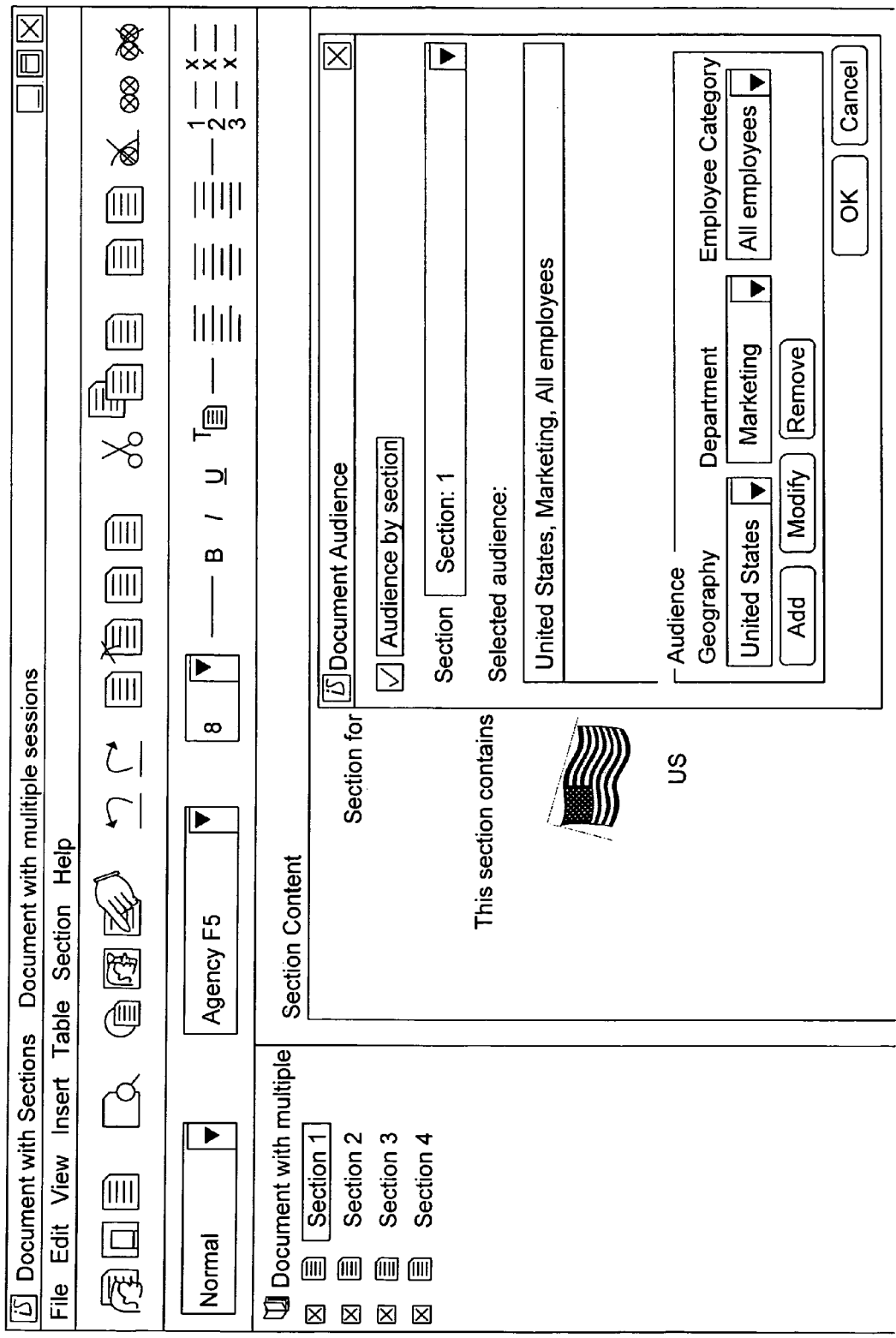
FIG. 4 illustrates the publishing aspect of one embodiment.

The user can also be permitted to publish the document to multiple coordinates. One way to do this is to allow a user to override the default settings by using selector 110 of FIG. 1 to create an association between the user's published document and any desired coordinate. The user publishes to a coordinate by having the document displayed in document viewing area 130 and by clicking on the "Publish" icon 124. At the time of clicking on Publish icon 124, whatever coordinate (i.e., set of dimension values) selected by selector 110 is associated with the document. A user publishes to multiple coordinates by repeatedly selecting the next coordinate to publish to and then clicking on the "Publish" icon at 124 while the document to be published is displayed. Note that the search rules described above, for example ascending filtering, permit users at different coordinates than a documents published coordinate to view and access the document as long as the users are within the filtering rule. FIG. 4 illustrates the publishing aspect of one embodiment.

The notion of "scope" refers to the collection of all user coordinates that can view and access a document. This can be more than the users at the document's published coordinate and at coordinates included within the filtering rules.

The system administrator can add coordinates to a document's (or document section's) scope. The system administrator can authorize, and exclude, users from accessing predetermined coordinates. This provides security and access controls based on any of the dimension values such as geographic region, employee position, etc. The system administrator, or another user, can also exclude users belonging to certain coordinates from viewing certain documents, or document portions. Thus, a document, or document portion, as explained below, can make use of its assigned coordinates, within the system to establish the document's "scope of visibility" to users. Naturally, any schemes for permitting or restricting documents, or document portions, from viewing can be used. For example, an access list of each specific community, or coordinate, that can view a document can be maintained. An exclusion list can similarly be maintained in tandem with the access list. Portions of a document can each be associated with one or more coordinates which are different from coordinates associated with other portions of the same document.

When a document is created, it is considered as a single section. This is referred to as the "Master Section." In many situations, this is the only section of the document and acts to associate the entire document with a coordinate or theme (discussed below). As the document is created, the document author can define document sections which can, in turn, be associated with different coordinates, themes and access requirements. For example, in one embodiment, a document may include sales reports which are excluded from all communities that do not include the "sales" or "executive" values. FIG. 5 illustrates a document with multiple sections having different dimension values.

Sections of a document can include, or entirely be, executable code such as Java, XML. Sections of a document can provide other mechanisms to invoke streaming media information, or perform other tasks. Such executable sections can be associated and restricted in the same way as text sections, described above. This allows greater flexibility, capability and control. For example, an executable section can cause a video or ShockWave™ window to appear and begin playing. Java can be used to have an embedded calculation box, spreadsheet, etc. appear in a document. Such functionality can be excluded from users not associated with predetermined slices, or from users who do not wish to access the functionality. Other examples include a price list where the European prices are only visible by people in European communities and where the U.S. prices are only visible by people in the U.S., etc.

Themes

In one embodiment, "themes" are used to help organize the presentation of information to a user, and to assist in publication of information across communities. Themes function as category headings for groups of documents which fall into the category.

FIG. 2D shows a portion of the user interface to illustrate theme headings. In FIG. 2D, theme headings are shown at 150. Below each heading are document titles. The document titles are indented from their respective theme headings. Although not shown in the black-and-white Figure, theme headings are red in one embodiment. Theme headings function as standard category headings. For example, under the "Demo" theme heading, the documents "Our Products," "Kit PreSales" and "Kit Sales" can be found. Although not shown, sub-themes can be used. For example, the "Demo" theme can have a sub-theme of "Kits" under which the last two documents would be listed.

Unlike communities which serve to categorize, and distinguish, documents according to company structure and timeframe; themes organize documents by document subject or type. In other words, dimensions describe a group of people, or community, while themes define content classification. For example, a theme can be documents related to employee "Stock Options." Such a theme can be associated only with countries that allow ownership of stock. In the example dimensions and values used so far, such a theme would be associated with the "U.S." and "U.K." values of the "Geographic Region" dimension. A publisher can publish to this theme by selecting from a list of themes at the time of publishing. The published document is automatically associated with the U.S. and U.K. values. The theme heading will only show up in communities that include the U.S. and U.K. values (assuming strict filtering), along with any documents associated with the theme. Users can use themes as part of a filter so that only documents matching selected themes' subject categories (in addition to the dimension values of the slice, or community) will be displayed.

In one embodiment, a theme is selected for a document by using a pull-down list such as that shown in FIG. 2E. The user associates a theme with a section by placing the cursor within the section (e.g., by clicking in a text region of the section) and by selecting the theme. Each user is assigned a default community to which the user belongs. A theme for the document is assigned by placing the cursor in the Master Section and selecting on the desired theme.

Hardware/Software Implementation

Various basic hardware suitable for use with the embodiments described herein may be employed.

A computer system including a display having a display screen may be provided. A cabinet may house standard computer components such as a disk drive, CDROM drive, display adapter, network card, random access memory (RAM), central processing unit (CPU), and other components, subsystems and devices. User input devices such as a mouse having buttons and keyboard may also be provided. Other user input devices such as a trackball, touch-screen, digitizing tablet, etc. can be used. In general, the computer system is illustrative of but one type of computer system, such as a desktop computer, suitable for use with the embodiments described herein. Computers can be configured with many different hardware components and can be made in many dimensions and styles (e.g., laptop, palmtop, pentop, server, workstation, mainframe). Any hardware platform suitable for performing the processing described herein is suitable for use with the embodiments described herein.

In another embodiment, subsystems that might typically be found in a computer such as the aforementioned computer may also be provided.

For example, subsystems within a box are directly interfaced to an internal bus. Such subsystems typically are contained within the computer system such as within the aforementioned cabinet. Subsystems include an input/output (I/O) controller, a system random access memory (RAM), a central processing unit (CPU), a display adapter, a serial port, and a fixed disk and network interface adapter. The use of a bus allows each of the subsystems to transfer data among the subsystems and with the CPU. External devices can communicate with the CPU or other subsystems via the bus by interfacing with a subsystem on the bus. A monitor connects to the bus through a display adapter. A relative pointing device (RPD) such as a mouse connects through a serial port. Some devices such as a keyboard can communicate with the CPU by direct means without using the main data bus as, for example, via an interrupt controller and associated registers.

As with the external physical configuration described above, many subsystem configurations are possible. The above described subsystem is illustrative of but one suitable configuration. Subsystems, components or devices other than those described above can be added. A suitable computer system can be achieved without using all of the subsystems described above. For example, a standalone computer need not be coupled to a network so a network interface would not be required. Other subsystems such as a CDROM drive; graphics accelerator, etc. can be included in the configuration without affecting the performance of the system of the embodiments described herein.

A typical network may also be provided.

For example, the network system includes several local networks coupled to the Internet. Although specific network protocols, physical layers, topologies, and other network properties are presented herein, the embodiments described herein are suitable for use with any network.

In one embodiment, computer USER1 is connected to Server1. This connection can be by a network such as Ethernet, Asynchronous Transfer Mode, IEEE standard 1553 bus, modem connection, Universal Serial Bus, etc. The communication link need not be a wire but can be infrared, radio wave transmission, etc. Server1 is coupled to the Internet. The Internet may include a collection of server routers. Note that the use of the Internet for distribution or communication of information is not strictly necessary to practice the embodiments described herein but is merely used to illustrate one embodiment, below. Further, the use of server computers and the designation of server and client machines is not crucial to an implementation of the embodiments described herein. USER1 Computer can be connected directly to the Internet. Server1's connection to the Internet is typically by a relatively high bandwidth transmission medium such as a T1 or T3 line.

Similarly, other computers may utilize a local network at a different location from USER1 computer. The computers are coupled to the Internet via Server2. USER3 and Server3 represent yet a third installation.

Note that the concepts of "client" and "server," as used in this application and the industry, are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information) and can be acting as a server at another point in time (because it is providing information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the embodiments described herein, and the hardware executing the processes, may be characterized by language common to a discussion of the Internet (e.g., "client," "server," "peer") it should be apparent that software of the embodiments described herein may execute on any type of suitable hardware including networks other than the Internet.

Although software of the embodiments described herein, may be presented as a single entity, such software is readily able to be executed on multiple machines. That is, there may be multiple instances of a given software program, a single program may be executing on two or more processors in a distributed processing environment, parts of a single program may be executing on different physical machines, etc. Further, two different programs, such as a client and server program, can be executing in a single machine, or in different machines. A single program can be operating as a client for one information transaction and as a server for a different information transaction.

Figure 3A:
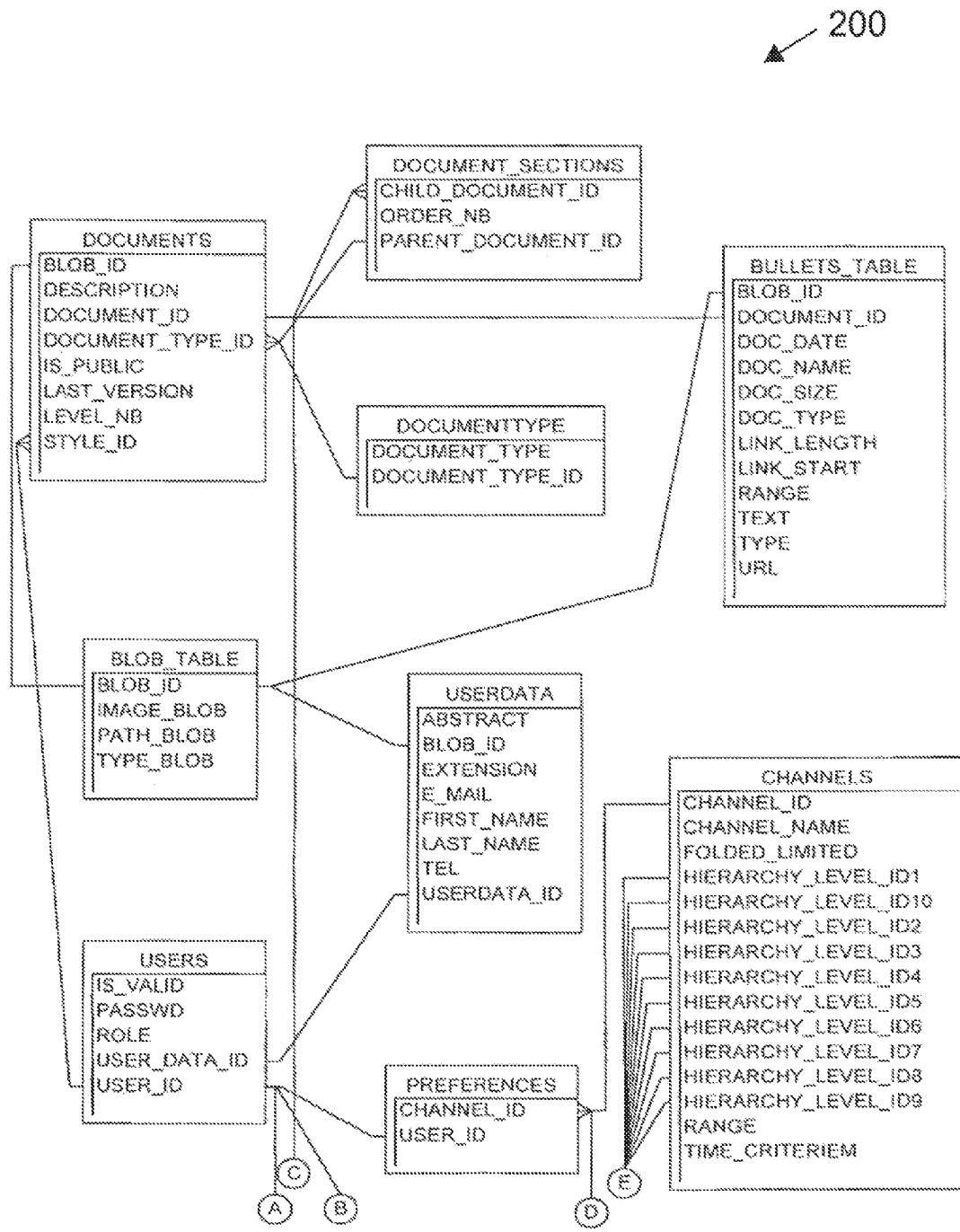
FIGS. 3A-B illustrate a model chart for basic data objects of the embodiments.
Figure 3B:
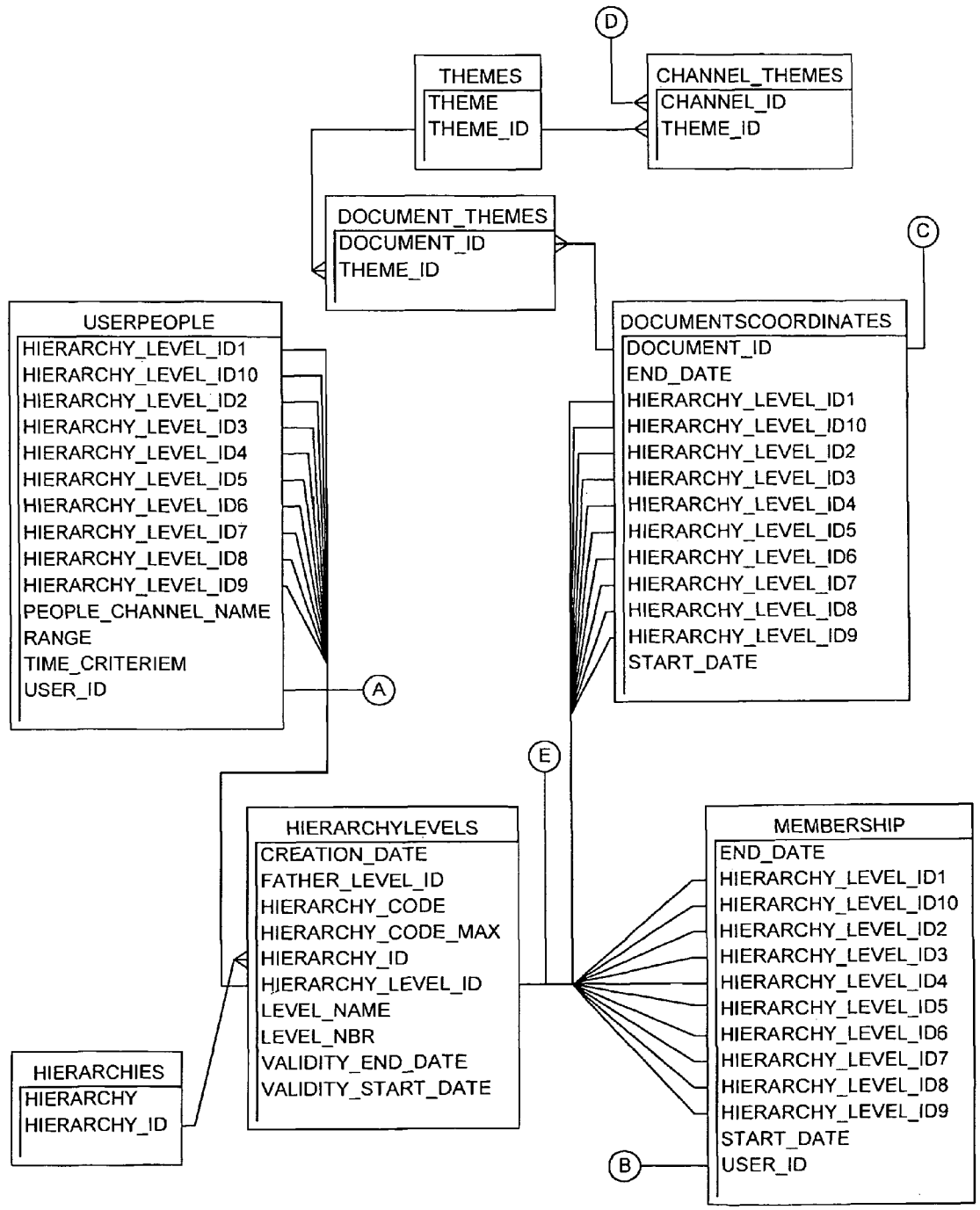

FIGS. 3A-B shows a model chart for basic data objects of the embodiments described herein.

For example, FIG. 3A shows that a document object 200 includes a "BLOB_ID," ""DESCRIPTION," "DOCUMENT_ID," etc. The BLOB_ID, in turn, references a blob table that includes additional information and/or references to other objects. Naturally, any manner of suitable software implementation can be employed that can use different, or varied, architectures of that of FIGS. 3A-B.

The embodiments described herein may operate on Microsoft NT or Unix platforms acting as servers. Client platforms can be any personal computer, consumer processing device, etc. In one embodiment, Java is used for client-side processing and uses Oracle 8i for the underlying database engine. Again, given the nature of computer processing, these specifics are merely one implementation of hardware and software that can be used to implement the embodiments described herein.

Although the present invention has been discussed with respect to specific embodiments, these embodiments are merely illustrative, and not restrictive, of the invention. The scope of the invention is to be determined solely by the appended claims.

What is claimed is:

1. A non-transitory computer-readable storage medium storing instructions which, when executed by a computing device, cause the computing device to perform a method for searching documents, with different users associated with different user coordinates which are associated with different one or more dimensions or one or more dimension values, the method comprising:
   defining a plurality of dimensions, each dimension having one or more dimension values that define one or more users;
   maintaining a plurality of documents, each document having a plurality of sections;
   determining a user coordinate, wherein the user coordinate is a specific set of dimension values;
   assigning one or more dimension values and an associated user coordinate to each section of each document;
   storing the plurality of sections of the plurality of documents in a retrievable form;
   identifying one or more dimension values associated with the user coordinate in accordance with a filtering methodology;
   displaying the different one or more dimensions or one or more dimension values in an interface as menu items depending on the different user coordinate determined, wherein the user can only access the menu items for only the one or more dimensions or one or more dimension values associated with the determined user coordinate, wherein different users are associated with different user coordinates; and
   identifying sections of one or more documents that meet the respective dimension values associated with the user coordinate in accordance with the filtering methodology, so that a user is permitted to access sections of the one or more documents that meet the dimension values in accordance with the filtering methodology.

2. The non-transitory computer-readable storage medium of claim 1, further comprising:
   accepting input specifying a document selected by the user from one or more displayed documents;
   identifying only sections of the selected document that meet the dimension values associated with the user coordinate in accordance with the corresponding filtering methodologies:
   accepting signals provided by a document creator to create a document, the created document having a plurality of sections; and
   accepting signals provided by the document creator to assign a value for at least one dimension to each section of the created document, wherein a first section of the created document and a second section of the created document are associated with different values for the same dimension, and wherein the user is given access to the plurality of sections of the created document based on the values assigned to the corresponding dimensions by the document creator.

3. The non-transitory computer-readable storage medium of claim 1, further comprising determining the one or more dimensions or one or more dimension values according to a timeframe.

4. The non-transitory computer-readable storage medium of claim 1, wherein the plurality of dimensions are associated with a plurality of categories, and wherein at least one of the one or more dimension values includes one or more hierarchical values.

5. The non-transitory computer-readable storage medium of claim 1, further comprising providing the sections of the one or more documents that meet the dimension values to the interface.

6. The non-transitory computer-readable storage medium of claim 1, further comprising determining the one or more dimensions and one or more dimension values according to an accessing device.

7. The non-transitory computer-readable storage medium of claim 6, further comprising determining the one or more dimensions and one or more dimension values according to a user location provided by the accessing device.

8. The method of claim 1, wherein the dimensions comprise geographical location, corporate department, employee classification, and time period.

9. An apparatus configured to search documents, with different users are associated with different user coordinates which are associated with different one or more dimensions or one or more dimension values, the apparatus comprising:
   one or more processors; and
   logic encoded in one or more tangible media for execution by the one or more processors and when executed operable to:

define a plurality of dimensions, each dimension having one or more dimension values that define one or more users;

maintain a plurality of documents, each document having a plurality of sections;

determine a user coordinate, wherein the user coordinate is a specific set of dimension values;

assign one or more dimension values and an associated user coordinate to each section of each document;

store the plurality of sections of the plurality of documents in a retrievable form;

identify one or more dimension values associated with the user coordinate in accordance with a filtering methodology;

displaying the different one or more dimensions or one or more dimension values in an interface as menu items depending on the different user coordinate determined, wherein the user can only access the menu items for only the one or more dimensions or one or more dimension values associated with the determined user coordinate, wherein different users are associated with different user coordinates; and identify sections of one or more documents that meet the respective dimension values associated with the user coordinate in accordance with the filtering methodology, so that a user is permitted to access sections of the one or more documents that meet the dimension values in accordance with the filtering methodology.

10. The apparatus of claim 9, wherein the logic when executed is further operable to:

accept input specifying a document selected by the user from one or more displayed documents;

identify only sections of the selected document that meet the dimension values associated with the user coordinate in accordance with the corresponding filtering methodologies;

accept signals provided by a document creator to create a document, the created document having a plurality of sections; and accept signals provided by the document creator to assign a value for at least one dimension to each section of the created document, wherein a first section of the created document and a second section of the created document are associated with different values for the same dimension, and wherein the user is given access to the plurality of sections of the created document based on the values assigned to the corresponding dimensions by the document creator.

11. The apparatus of claim 9, wherein the logic when executed is further operable to determine the one or more dimensions or one or more dimension values according to a timeframe.

12. The apparatus of claim 9, wherein the plurality of dimensions are associated with a plurality of categories.

13. The apparatus of claim 9, further comprising providing the sections of the one or more documents that meet the dimension values to the interface.

14. The apparatus of claim 9, wherein the logic when executed is further operable to determine the one or more dimensions and one or more dimension values according to an accessing device.

15. The apparatus of claim 14, wherein the logic when executed is further operable to determine the one or more dimensions and one or more dimension values according to a user location provided by the accessing device.

* * * * *